US006270012B1

(12) United States Patent
Dawson

(10) Patent No.: US 6,270,012 B1
(45) Date of Patent: Aug. 7, 2001

(54) DEBIT CARD WITH ACTIVATION CONTROL

(75) Inventor: Murray Dawson, Clarendon Hills, IL (US)

(73) Assignee: Magnetic Ticket & Label Corp., Dallas, TX (US)

( * ) Notice: Subject to any disclaimer, the term of this patent is extended or adjusted under 35 U.S.C. 154(b) by 0 days.

(21) Appl. No.: 08/664,769

(22) Filed: Jun. 17, 1996

(51) Int. Cl.[7] .......... G06F 7/08
(52) U.S. Cl. .......... 235/381; 379/112
(58) Field of Search .......... 235/486, 487, 235/493, 380, 381; 206/39, 460; 379/112, 114; 283/81

(56) References Cited

U.S. PATENT DOCUMENTS 5,506,395 * 4/1996 Eppley .......... 235/486
5,577,109 * 11/1996 Stimson et al. .......... 235/381
5,609,253 * 3/1997 Goade .......... 206/460

* cited by examiner

*Primary Examiner*—Thien M. Le
(74) *Attorney, Agent, or Firm*—Garvey, Smith, Nehrbass & Doody, LLC

(57) ABSTRACT

A method for providing security for the embedded value of a debit card and a secured debit card package having an embedded value and being adapted to be sold from open and unprotected retail shelving. The second debit card package comprises a debit card, formed as from a first material bearing a card identification number, and packaging formed as from a second different material securing the debit card thereto, the packaging defining a window through which the card identification number is visible, a magnetic stripe disposed on the packaging, the magnetic stripe bearing an encoded representation of a card identification number borne by the debit card, the stripe being positioned to be scanned by a terminal for reading the encoded representation from the packaging and for transmitting the encoded representation to a remote processing center for testing of the representation to determine whether the debit card should be activated.

21 Claims, 3 Drawing Sheets

DEBIT CARD WITH ACTIVATION CONTROL

FIELD OF THE INVENTION

This invention relates generally to debit cards and in particular to a debit card that functions as a prepaid telephone calling card, and is more particularly directed toward a debit card having activation control to forestall fraudulent debit card use.

BACKGROUND OF THE INVENTION

Credit cards and charge cards are well-known. A credit card entitles the user to revolving credit, in which at least a portion of the outstanding balance must be paid periodically, while the entire balance due on a charge card must ordinarily be paid within a prearranged time.

A debit card allows the bearer to utilize the same purchasing process as with a credit or charge card, with the exception that the holder of a debit card must maintain a nonzero balance in an associated account at all times. Use of a debit card does not involve the extension of credit to the bearer, thus the name "debit card."

Since many transactions once involving the exchange of cash or commercial paper have become strictly electronic, use of credit and debit cards in a wide variety of transactions has grown rapidly. Debit cards with intrinsic cash value are becoming available at retail outlets, with the purchase of long distance telephone services being among their current primary purposes.

A debit card with intrinsic cash value has no need for an associated account. When these cards are made and transmitted for sale or distribution, they are good for a predetermined dollar amount of goods or services, and the purchaser pays all or a portion of this dollar amount in exchange for the card. To minimize overhead associated with manufacture and distribution, cards of this type are generally usable at the time they are shipped from their point of origin.

Of course, one disadvantage of this approach is that active and completely usable debit cards often hang from display racks in retail outlets, where even a marginally clever sneak-thief could shoplift as many as he pleased. Stolen debit cards are often sold to others at discount prices, or used by the thief.

Active and usable cards could also be stolen in transit to their point of sale with the same result. Because of the effort to minimize production and distribution overhead, there may be no record of the individual serial numbers of stolen cards, and no way to deactivate them even if the numbers were known.

Some efforts have been made to minimize the risk of card fraud. In the simplest scheme known in the prior art, the authorization code, such as a PIN, or personal identification number, is hidden from view by associated packaging. This prevents a thief from simply writing down the PIN and enjoying free long-distance calling without even having possession of the calling card itself.

In the operation of a debit card system, a special telephone number is normally dialed by the user, followed by the PIN number from the debit card. The user then dials the number of the party he wishes to call. A central data base keeps track of the remaining balance associated with the user's PIN number, and refuses further service after the balance has been reduced to zero. Some prepaid debit card companies provide a recorded message to the user when the debit card balance has been reduced to a predetermined small amount.

The act of concealing PIN numbers from view helps to deter casual theft by simple observation of a visible PIN number, but does not prevent theft of services by one who pilfers the card itself. A more effective deterrent is the distribution of inactive cards only, which cards must be activated at a point of sale before they will function as calling cards.

In one known prior art development, shown in U.S. Pat. No. 5,511,114, blank debit cards are transported to distribution points in an inactivated state. The process for initially activating or recharging such cards involves selection of information via the keys of an appropriate terminal, as well as transmission of an identification number associated with the card. Once a particular transaction type, such as recharging, is selected on the terminal, and the card identification number has been transmitted, the operator enters a dollar amount and is prompted by the terminal to collect money from the purchaser. The remote data base with which the terminal is in contact creates a data base record in response to terminal input, and sends a confirmation back to the terminal. For the type of card transaction just described, the terminal itself is the authorizing instrumentality.

For a simple activation transaction not involving recharging of a card, the operator must still input a transaction type and an initial dollar amount via the terminal, and transmit the card identification number, before authorization can proceed. The remote data base creates a data base record in response to operator input transmitted from the terminal, and returns a confirmation to the terminal that the card identification number has been received. Once again, actual authorization of the card takes place at the terminal, while the remote data base performs a bookkeeping function.

In another prior art system, a paperboard blank having several sections is formed. A first full-sized panel is connected along a line of serrations to a second full-sized panel. A third narrower panel is secured via a line of serrations to the second panel. The third narrower panel secures a smaller sized, prepaid debit card thereto along a line of serrations. The first panel is coated to provide a glossy finish. The second panel bears a magnetic stripe applied as a tape. The debit card is specially coated on both sides and has a PIN number or authorization code printed on the front of the debit card. The PIN number is applied at substantially the same time information is applied to the magnetic stripe. Eventually the third panel is infolded against the second panel, the folded second and third panels are infolded against the first panel and the first panel and infolded second and third panels are secured adhesively to each other. The stripe on the folded blank may thereafter be scanned at a cash register, and the debit card is thereafter activated in response to the scanning, as via a remote computer.

A need exists for an improved secure debit card system having simple activation control.

SUMMARY OF THE INVENTION

These needs and others are satisfied by the present invention, which comprises a secured debit card package having an embedded value and being adapted to be sold from open and unprotected retail shelving. The secured debit card package comprises a debit card formed from a first material bearing a card identification number, and packaging means separate and distinct from the debit card and mounting the debit card therein, the packaging means defining a window through which the card identification number is visible, a magnetic stripe disposed on the packaging means, the magnetic stripe bearing an encoded representation of the card identification number borne by the debit card, the stripe being positioned to be scanned by a terminal for reading the encoded representation from the packaging means and for transmitting the encoded representation to a remote processing center for testing of the representation to determine whether the debit card should be activated.

The debit card may bear first and second card identification numbers, with the first card identification number comprising a PIN number, and wherein the packaging means obscures the PIN number on the debit card while rendering the second card identification number visible through the window. The card identification number may be displayed in a bar code format and/or in a human readable format. The package comprises a substantially opaque paper backing with a substantially transparent plastic film covering the debit card.

In accordance with another aspect of the invention, a method is described for providing security for the embedded value of a debit card adapted to be displayed and sold in an unsecured environment such as a retail establishment. The method comprises the steps of providing a debit card having an embedded value with a card identification number, securing the debit card within the package and defining a window through which the identification number is visible, providing a magnetic stripe on the package, reading the card's identification number through the window, providing an encoded representation of the card identification number on the stripe, the magnetic stripe being positioned on the package to be presented to a terminal for reading and transmission of the encoded representation to a remote computer; whereby, when the remote computer receives the encoded representation, the remote computer may determine whether the embedded value is authorized for use.

The debit card may bear first and second card identification numbers, with the first card identification number comprising a PIN number, and wherein the package obscures the PIN number on the debit card while rendering the second card identification number visible through the window.

The method comprises the further step of receiving the encoded representation at a remote computer and determining whether the embedded value is authorized for use. The remote computer may test the received encoded representation for an anticipated association with the terminal from which the encoded representation was transmitted. The debit card is activated when the anticipated association is present.

In another form of the invention, a debit card system with activation control comprises a debit card bearing a card identification number, a package substantially surrounding the debit card, the package being adapted to make the card identification number visible therethrough, a magnetic stripe disposed on the package, the magnetic stripe bearing an encoded representation of the card identification number, a terminal adapted to read a representation of the card identification number from the package and transmit the representation to a remote processing center, the terminal having a terminal identification number, and a remote processing center for testing the representation and activating the debit card for use by a purchaser.

The debit card may bear first and second card identification numbers, with a first card identification number comprising a PIN number, and wherein the package obscures the PIN number on the debit card while rendering the second card identification number visible.

The remote processing center may test the representation of the card identification number and the terminal identification number, and, if an anticipated association exists, activate the debit card for use by a purchaser.

The terminal adapted to read a representation of the card identification number may read the representation of the card identification number from the magnetic stripe, or from the debit card through the package. The anticipated association may comprise a correspondence between the geographic location to which the debit card was shipped and the geographic location of the terminal identified by the terminal identification number.

Further objects, features, and advantages of the present invention will become apparent from the following description and drawings.

DETAILED DESCRIPTION OF THE INVENTION

In accordance with the present invention, a debit card with activation control is described that provides distinct advantages when compared to those of the prior art. The invention can best be understood with reference to the accompanying drawing figures.

Figure 2:
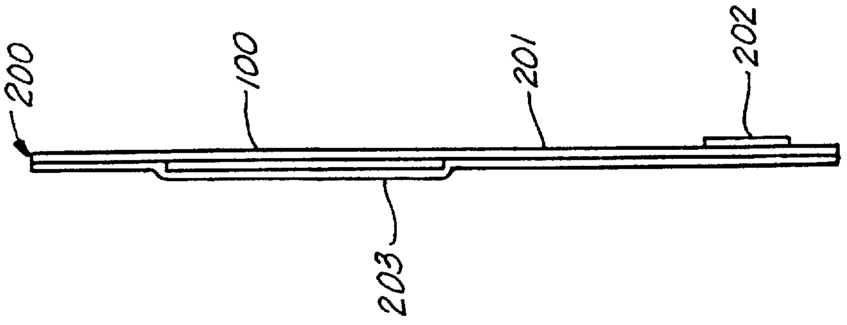
FIG. 2 is a side elevational view of the debit card and package of FIG. 1.
Figure 1:
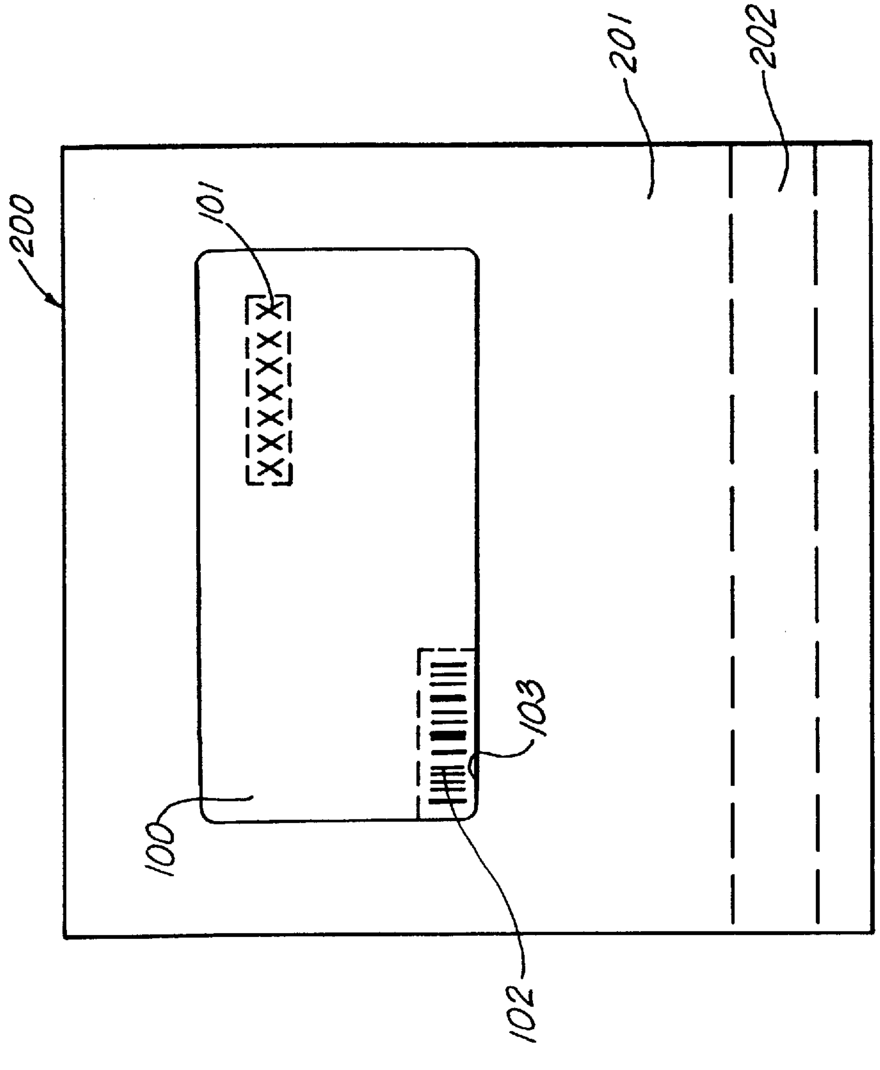
FIG. 1 is a front elevational view of a debit card package in accordance with the present invention.
Figure 3:
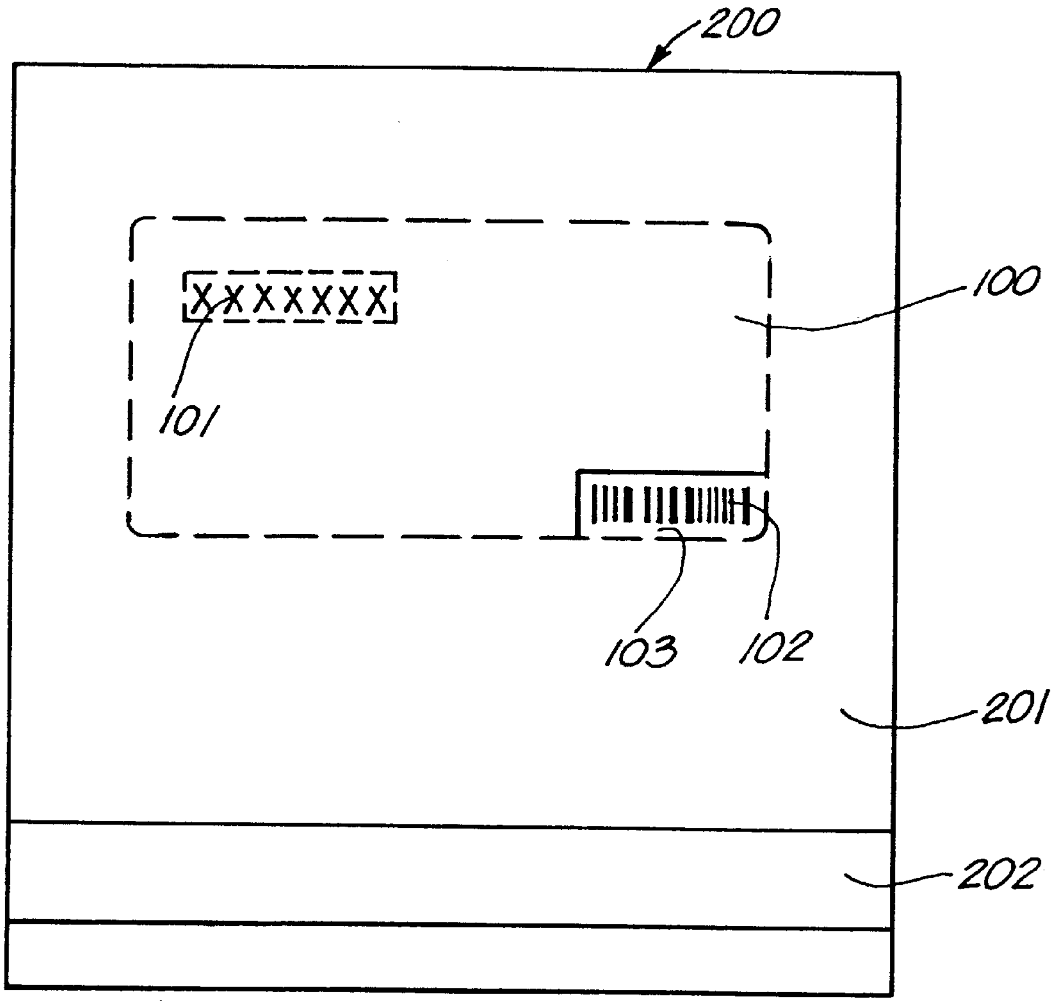
FIG. 3 is a rear elevational view of the debit card and package of FIG. 1.

FIGS. 1–3 depict a debit card 100 and an associated package 200 in accordance with the present invention. The card or document 100 is fabricated from a suitable first material, such as plastic, paper, a plastic-coated paper, or laminates. Use of the debit card 100 generally requires that a personal identification number, or PIN, be entered during the course of the transaction. In telephone debit card applications, entry of the user's PIN would normally occur after the entry of an access telephone number, but before the user dials the called telephone number. The location of the PIN number 101 on the debit card 100 is hidden from casual observation by the package 200.

The debit card 100 is typically made of plastic in a thickness range of from about 0.005 to about 0.040 inch. It is made separate and apart from the package, is usually of a different material and is collated with the packaging during the assembly process. The debit card 100 is usually of plastic, although it may be a laminate as well.

The package 200 is formed from a suitable second material 201, such as paper. It is usually of a board stock, and may be made of a 15 point coated one-side board stock, although it may be a laminated board or other laminate. The package 201 is desireably distinct and separate from the debit card and typically of a different material. Preferably, the package backing material is opaque, in order to obscure the PIN number on the debit card 100, as described above. A transparent shrink wrap plastic film 203, applied using well-known methods, covers the debit card 100 and secures the debit card 100 to the package 200. In the alternative, a transparent plastic cover with an appropriately sized, generally rigid, embossed area accommodating the card 100 may be affixed to the backing sheet 201 as by a conventional adhesive, and forming a structure commonly known as a "blister pack." This alternative packaging arrangement is not illustrated.

The debit card loo also bears a card identification number 102. A window or opening 103 is provided through the back of the package 200 so that a card or document identification number 102 is visible therethrough. If the card identification number is on the front of the card, the transparent portion of the package may serve the window function. The document identification number may be provided in machine readable form, such as a bar code, and may also be provided in human readable form.

The package 200 also includes a magnetic stripe 202 of conventional construction, such as one deposited from a slurry, positioned on the package 200 so that it can be scanned in well-known magnetic stripe reading equipment. Such magnetic stripe readers are common in retail establishments for credit card transactions. A terminal such as a Tranz 380 made by Verifone is suitable in this application.

Encoded on the magnetic stripe 202 on the package is a representation of the debit card identification number. For purposes of security, the PIN number 101 will not normally be encoded on the magnetic stripe 202, but the card identification number 102, or another number borne by the debit card 100, will be selected for encoding in the appropriate magnetic format. For additional security, the selected number may also be subjected to an encryption algorithm, many of which are well-known in the art, prior to encoding on the magnetic stripe 202.

It is apparent that the debit card may be enveloped within an opaque package, as of one made of a board stock. The card may be secured to one inner face, as via an adhesive body, and located so that the document identification number is visible through a window. Thus, it may be read therethrough for "entry" onto the magnetic stripe 202.

Although the PIN number is shown as being in a human readable form for use as described above, it may be present in a variety of other forms as well. Thus, it could as be in the form of a bar code to be scanned by a scanner at the time the card is to be identified by the data base. The PIN number could also be entered on a magnetic stripe on the debit card for scanning or could be available from a chip and related circuitry if the debit card was constructed as a so-called smart card. When such a card was presented to a suitable reader, the debit card could be identified for use.

In accordance with the present invention, a method of making a secured debit card package for display and sale in an unsecured environment such as a retail establishment is provided. As has been seen, the method comprises (a) providing a plurality of pre-formed debit cards 100 of a first material, each debit card bearing a card identification number 102 and each debit card having an embedded value, (b) providing a plurality of packages 200, each package being adapted to house a debit card, each package defining a window such as window 103, and having a magnetic stripe 202, (c) securing a debit card to a package with the card identification number being visible through the window, and after securing the debit card to a package, (d) then reading the card identification number through the window and applying an encoded representation of the debit card identification number to the magnetic stripe 202. As such, when the magnetic stripe 202 is presented to a terminal, such as to a terminal 402, for reading the encoded representation, the representation may be transmitted to a remote computer for authorizing the use of the embedded value.

Figure 4:
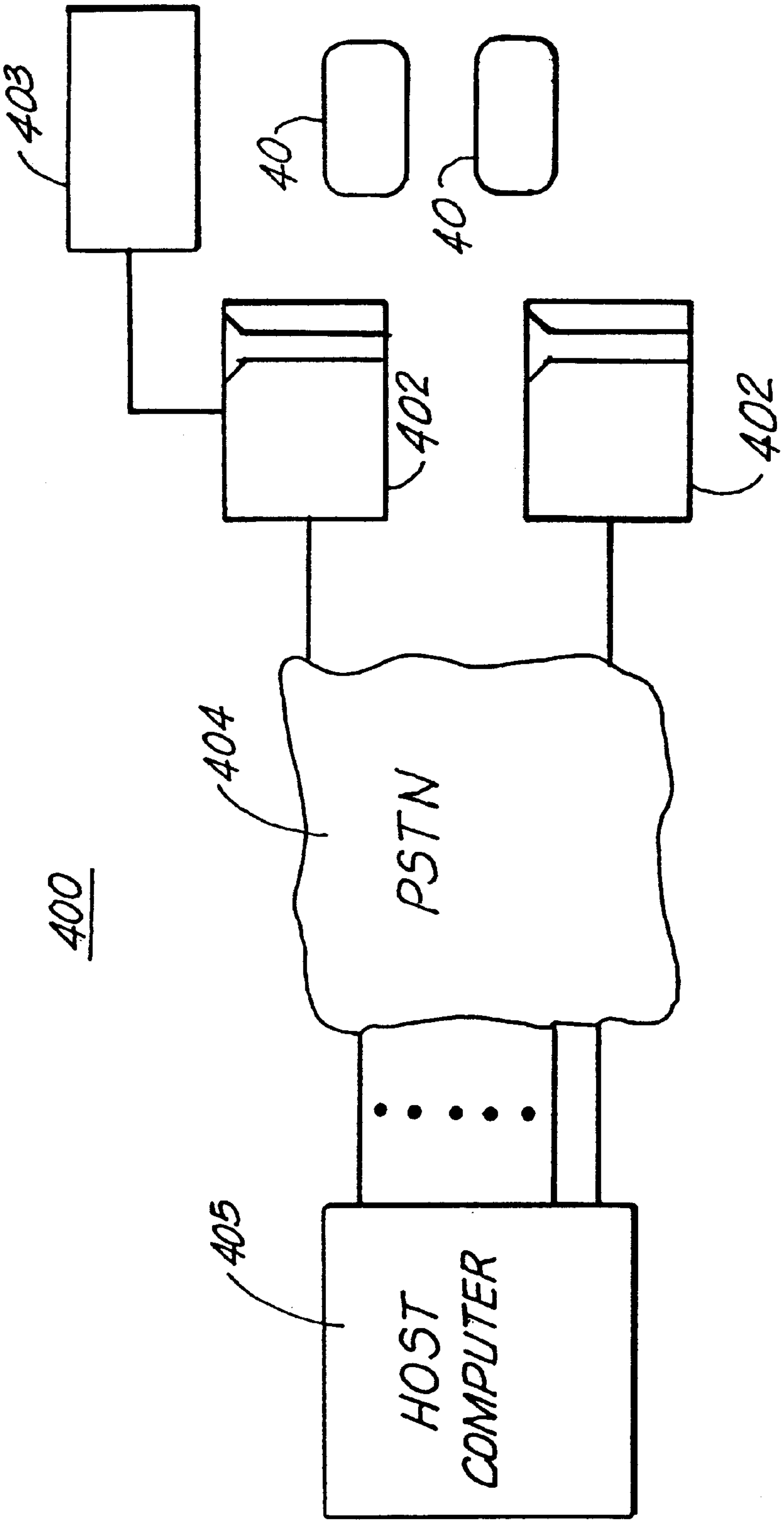
FIG. 4 is a block diagram representation of a debit card system in accordance with the present invention.

FIG. 4 illustrates a debit card system 400 in accordance with the present invention. The system is adapted to respond to a plurality of debit cards 401, with each of the debit cards 401 bearing an identification number 102, 102', etc., either on the packaging or on the card itself, in machine readable form.

Of course, a machine readable format may mean a magnetic stripe 202 as described above. Each of a plurality of data terminals 402 preferably includes a magnetic stripe reader. Each terminal 402 may also include an alternative input means 403, such as a bar code reader or optical character reader, for example, for inputting card identification numbers.

The terminals 402 are connectable to a remote processing center or host computer 405 as via a suitable network, such as the public switched telephone network (PSTN) 404. Each of the terminals 402 has an associated terminal identification number, and this may be transmitted to the host computer 405 during the course of connecting a terminal 402 to the host computer 405.

Associated with the host computer 405 is a data base. The data base has a record for each debit card 401, with each record including an identification number associated with each debit card 401. When cards 401 are shipped to a retail distribution point, the card numbers may be recorded in the data base along with other desirable indicia, such as the destination retail establishment. The cards 401 are shipped in an inactivated state in order to minimize potential losses due to theft, fraud, or mishaps in transit, and to allow the cards to be displayed with impunity in open and unprotected retail shelving, because they are not usable without deliberate activation at a retail establishment.

When a card 401 is to be sold, it is presented at a check-out station, as to a check-out clerk. In a preferred form of the invention, the clerk swipes the magnetic stripe through a terminal 402, such as a Verifone Tranz 380. The reader transmits the encoded representation of the card identification number to the host computer 405 via the terminal 402. Upon receipt of the encoded representation, the processing portion of the host computer 405 tests the encoded representation to determine whether the debit card 401 should be activated for use, as by scanning the associated data base to determine that the card has not been stolen, that the card is genuine, etc. If the card is determined to be one which should be honored, the PIN number associated with the debit card will then be activated for use, so that the purchaser of the card may use it.

The host computer 405 may also test the received card identification number for an anticipated association. Since the identification numbers of the cards shipped to a particular customer may have been recorded, and the identification numbers of the data terminals 402 associated with that customer may also be known, the host computer may check whether the activation transaction is originating from a data terminal 402 associated with the intended customer. If so, the card 401 is activated. If not, activation of the card 401 is refused.

An activation transaction of this type requires no additional input from retail personnel. The identification number of the card 401 need only be read by an appropriate data terminal 402, and activation of the card is effected by the host computer 405. Of course, if activation is refused, an appropriate message could be transmitted to the originating data terminal 402, just as refusal to complete a credit card transaction would be signalled to the originating data terminal.

There has been described herein a debit card with activation control that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A secured debit card package having an embedded value and being adapted to be sold from open and unprotected retail shelving, said secured debit card package comprising:

a debit card bearing at least one card identification number on a first surface thereof;

packaging means separate and distinct from said debit card, said packaging means mounting the debit card therein, and defining a window in said packaging means and confronting said first surface through which said one card identification number is visible, a magnetic stripe disposed on the packaging means, the magnetic stripe bearing an encoded representation of said one card identification number which is visible through said window, said stripe being positioned to be scanned by a terminal for reading said encoded representation from the packaging means and for transmitting said encoded representation to a remote processing center for testing of said representation to determine whether said debit card should be activated.

2. The secured debit card package of claim 1, wherein said debit card is formed from a first material and said packaging means is formed from a second different material.

3. The secured debit card package of claim 1, wherein said debit card bears two card identification numbers, and wherein a second card identification number comprises a PIN number, and wherein said packaging means obscures the PIN number on the debit card and renders the one card identification number visible through said window.

4. The secured debit card package of claim 1, wherein said card identification number is displayed in a bar code format.

5. The secured debit card package of claim 1, wherein said card identification number is displayed in a human readable format.

6. The secured debit card package of claim 1, wherein said packaging means comprises a substantially opaque paper backing confronting said debit card first surface with a substantially transparent plastic film overlying the other surface of said debit card.

7. A method of providing security for the embedded value of a debit card adapted to be displayed and sold in an unsecured environment such as a retail establishment, the method comprising the steps of:

providing a debit card having an embedded value with a card identification number;

securing said debit card within a package defining a window through which said card identification number is visible;

providing a magnetic stripe on said package;

reading the card identification number through said window, and providing an encoded representation of said card identification number on said stripe, said magnetic stripe being positioned on said package to be presented to a terminal for reading and transmission of said encoded representation to a remote computer, whereby, when said remote computer receives said encoded representation, the remote computer may determine whether the embedded value is authorized for use.

8. The method in accordance with claim 7, wherein said debit card bears first and second card identification numbers, said first card identification number comprises a PIN number, and wherein said package obscures the PIN number on the debit card while rendering the second card identification number visible through said window.

9. The method in accordance with claim 7, and wherein said method comprises a further step of receiving said encoded representation at a remote computer and determining whether the embedded value is authorized for use.

10. The method in accordance with claim 9, wherein the remote computer tests the received encoded representation for an anticipated association with the terminal from which the encoded representation was transmitted.

11. The method in accordance with claim 10, wherein the debit card is activated when the anticipated association is present.

12. The method in accordance with claim 10, wherein the debit card is not activated if the anticipated association is absent.

13. A method of making a secured debit card package for display and sale in an unsecured environment such as a retail establishment, comprising the steps of providing a plurality of pre-formed debit cards of a first material, each debit card bearing a card identification number and each debit card having an embedded value, providing a plurality of packages, each package being adapted to house a said debit card, each said package defining a window and having a magnetic stripe, securing a said debit card to a said package with said card identification number being visible through said window, and after securing a said debit card to a said package, reading said card identification number through said window and applying an encoded representation of said debit card identification number to said magnetic stripe, whereby when said magnetic stripe is presented to a terminal for reading said encoded representation, said representation may be transmitted to a remote computer for authorizing the use of said embedded value.

14. A debit card system with activation control, the debit card system comprising:

a debit card having front and rear surfaces and bearing a card identification number;

a package substantially surrounding the debit card, the package being adapted to make said card identification number visible therethrough;

a magnetic stripe disposed on the package, the magnetic stripe bearing an encoded representation of said card identification number derived from viewing the identification number on the debit card after it is surrounded by the package;

a terminal adapted to read a representation of said card identification number from the package and transmit said representation to a remote processing center, said terminal having a terminal identification number; and a remote processing center for testing said representation and activating said debit card for use by a purchaser.

15. The debit card system of claim 14, wherein said debit card bears first and second card identification numbers, said first card identification number comprising a PIN number, said package obscuring the PIN number on the debit card while rendering the second card identification number visible.

16. The debit card system of claim 14, wherein said remote processing center tests said representation and said terminal identification number, and, if an anticipated association exists, activates said debit card for use by a purchaser.

17. The debit card system of claim 14, wherein said terminal adapted to read a representation of said card identification number reads said representation of said card identification number from the magnetic stripe.

18. The debit card system of claim 14, wherein said terminal adapted to read a representation of said card identification number reads said representation of said card identification number from the debit card through the package.

19. A debit card system with activation control, the debit card system comprising:

a debit card bearing a card identification number;

a package substantially surrounding the debit card, the package being adapted to make said card identification number visible;

a magnetic stripe disposed on the package, the magnetic stripe bearing an encoded representation of said card identification number;

a terminal adapted to read a representation of said card identification number from the package and transmit said representation to a remote processing center, said terminal having a terminal identification number;

a remote processing center for testing said representation and activating said debit card for use by a purchaser; and wherein said remote processing center tests said representation and said terminal identification number, and, if an anticipated association exists, activates said debit card for use by a purchaser; and wherein said anticipated association comprises a correspondence between the geographic location to which said debit card was shipped and the geographic location of the terminal identified by said terminal identification number.

20. The secured debit card package of claim 1, wherein said debit card bears two card identification numbers on said first surface and said packaging means comprises a substantially opaque backing defining said window in a selected location, and wherein a first card identification number is visible through said window and a second card identification number is a PIN number which is obscured by said opaque backing.

21. The method of claim 13, and wherein said pre-formed debit cards bear two card identification numbers, one being a PIN number and wherein the step of securing a said debit card to a said package includes obscuring the PIN number in a location spaced from said window.

* * * * *